United States Patent
Hongladarom et al.

(10) Patent No.: US 10,370,492 B2
(45) Date of Patent: *Aug. 6, 2019

(54) UV-CURABLE FILM COMPOSITIONS WITH IMPROVED SCRATCH RESISTANCE

(71) Applicant: SABIC GLOBAL TECHNOLOGIES B.V., Bergen op Zoom (NL)

(72) Inventors: Kwan Hongladarom, Mt. Vernon, IN (US); Jean-Francois Morizur, Evansville, IN (US); Paul Dean Sybert, Evansville, OH (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 96 days.

This patent is subject to a terminal disclaimer.

(21) Appl. No.: 14/211,552

(22) Filed: Mar. 14, 2014

(65) Prior Publication Data
US 2014/0272347 A1    Sep. 18, 2014

Related U.S. Application Data

(60) Provisional application No. 61/792,767, filed on Mar. 15, 2013.

(51) Int. Cl.
*C08G 64/42* (2006.01)
*B29C 47/00* (2006.01)
(Continued)

(52) U.S. Cl.
CPC ............ *C08G 64/42* (2013.01); *B29C 48/022* (2019.02); *B32B 27/365* (2013.01); *C08G 64/14* (2013.01);
(Continued)

(58) Field of Classification Search
CPC ........ C08G 64/42; C08G 64/14; C08G 64/24; C08L 69/00; B29C 47/0004;
(Continued)

(56) References Cited

U.S. PATENT DOCUMENTS 4,153,780 A    5/1979    Narita et al.
4,333,809 A    6/1982    Schreckenberg et al.
(Continued)

FOREIGN PATENT DOCUMENTS

CN    101479340 A    7/2009
CN    104955872 A    9/2015
(Continued)

OTHER PUBLICATIONS

Translation of DE 2746139 A1. accessed Apr. 18, 2017.*
(Continued)

*Primary Examiner* — Nancy R Johnson
(74) *Attorney, Agent, or Firm* — Cantor Colburn LLP

(57) ABSTRACT

Thin walled products having good scratch resistance are disclosed, as are processes for making such products (e.g. films, sheets, and thin walled articles). The product includes a thin layer formed from (A) a cross-linkable polycarbonate resin having endcaps derived from a monohydroxybenzophenone; and (B) if desired, a base polymeric resin. When exposed to ultraviolet light, crosslinking will occur in the layer with the cross-linkable polycarbonate resin, enhancing the scratch resistance properties of the thin layer and the overall product.

18 Claims, 5 Drawing Sheets

(51) Int. Cl.
  *B32B 27/36* (2006.01)
  *B29C 48/00* (2019.01)
  *C08G 64/14* (2006.01)
  *C08G 64/24* (2006.01)
  *C08L 69/00* (2006.01)

(52) U.S. Cl.
  CPC .............. *C08G 64/24* (2013.01); *C08L 69/00* (2013.01); *Y10T 428/2495* (2015.01); *Y10T 428/269* (2015.01); *Y10T 428/31507* (2015.04)

(58) Field of Classification Search
  CPC ....... Y10T 428/31507; Y10T 428/2495; Y10T 428/269; B32B 27/365
  See application file for complete search history.

(56) References Cited

U.S. PATENT DOCUMENTS

| | | | |
|---|---|---|---|
| 4,831,109 | A | 5/1989 | Mitra et al. |
| 5,034,496 | A | 7/1991 | Bales et al. |
| 5,916,942 | A | 6/1999 | Scholl et al. |
| 2008/0011513 | A1* | 1/2008 | Kamps .................. C08G 63/64 174/565 |
| 2011/0070448 | A1* | 3/2011 | Matsumura ............. B29C 53/04 428/412 |
| 2011/0306712 | A1* | 12/2011 | Inagaki .................. C08L 69/00 524/165 |
| 2012/0253002 | A1 | 10/2012 | Ozaki et al. |

FOREIGN PATENT DOCUMENTS

| | | | |
|---|---|---|---|
| DE | 2746139 A1 * | 4/1979 | ............ C08G 63/64 |
| DE | 2746141 | 4/1979 | |
| EP | 0 001 577 A1 | 5/1979 | |
| JP | 08-238309 | 9/1996 | |
| JP | 2002-226571 | 8/2002 | |

OTHER PUBLICATIONS

PCT ISR dated Jul. 8, 2014 in corresponding PCT/US2014/028139.
Chinese Office Action for Chinese Patent Application No. 201480016231.X dated Feb. 13, 2017 (with English translation).

* cited by examiner

UV-CURABLE FILM COMPOSITIONS WITH IMPROVED SCRATCH RESISTANCE

This application claims priority to U.S. Provisional Patent Application Ser. No. 61/792,767, filed Mar. 15, 2013. The disclosure of each application is hereby fully incorporated by reference herein.

BACKGROUND

The present disclosure relates to films, sheets, and other thin walled products having improved scratch resistance. These products include additives that can be used to crosslink polymers, such as polycarbonate polymers, for improved properties. Also included are compositions including such additives, as well as products (e.g. molded or extruded articles, sheets, films, profiles, etc.) formed from such compositions.

Polycarbonates (PC) are synthetic engineering thermoplastic resins, and are a useful class of polymers having many beneficial properties. Polycarbonate resins are both strong and transparent, and are used for a number of different commercial applications, including electronic engineering (E&E) parts, mechanical parts, graphic and decorative parts, etc.

Polycarbonate polymers/resins and blends containing polycarbonate polymers exhibit flame retardance properties. However, such polymers drip when exposed to a flame, and this behavior worsens as the wall thickness decreases. This behavior greatly diminishes their use in transparent and opaque thin wall applications where a V0 or 5VA flame retardance rating is required. These polymers also have relatively poor chemical resistance and are easy to scratch. It would be desirable to provide additives that can improve these properties.

One way to achieve better scratch resistance and chemical resistance is to post-coat polycarbonate components with a coating that when cured crosslinks and provides the desired performance. The coating forms a bonded hard layer on the surface and has a thickness typically from 3 micrometers (μm) to 18 μm. Examples of such hard coats include acrylate hard coats that are either ultraviolet (UV) or thermally curable, silicone hard coats with acrylate primers, polyurethane hard coats, and melamine hard coats. However, an extra post-production coating step is required to apply and cure these coatings to the polycarbonate film surface. It would be desirable to eliminate this extra step.

BRIEF DESCRIPTION

The present disclosure relates to processes for producing a thin walled product having good scratch resistance without requiring an additional coating step. Generally, a thin walled product, such as a film layer comprising a photoactive additive, is produced, such as by being extruded, as a monolayer film, co-extruded with another layer, or laminated to form a multilayer composite, and then exposed to ultraviolet (UV) light. The UV exposure causes crosslinking in the film layer of the thin walled product, which improves the scratch resistance of the thin walled product. In embodiments where the photoactive additive is an oligomer or a polymer, the film layer may further comprise a base polymeric resin. The product can be a film, a sheet, or a thin walled article. In this regard, a thin wall is a section of a product that is extremely thin in comparison to its length and width, and generally has a nominal maximum thickness of 3 mm.

Disclosed in various embodiments herein are thin walled products having improved scratch resistance, comprising: a crosslinked layer formed from a photoactive additive that has been exposed to ultraviolet light, the photoactive additive containing a photoactive group derived from a monohydroxybenzophenone.

The thin walled product can have a scratch rating of B or harder according to ASTM D3363.

Sometimes, the thin walled product further comprises a substrate layer formed from a substrate resin and bonded to the crosslinked layer. The crosslinked layer can be from about 2% to about 40% of the thickness of the thin walled product. Alternatively, the crosslinked layer can have a thickness of about 2.5 micrometers to about 12.7 millimeters. The substrate resin may be a polycarbonate film.

In particular embodiments, the photoactive additive is formed from the reaction of: a monohydroxybenzophenone; a diol chain extender; and a first linker moiety comprising a plurality of linking groups, wherein each linking group reacts with the hydroxyl groups of the monohydroxybenzophenone and the diol chain extender.

In specific embodiments, the monohydroxybenzophenone is 4-hydroxybenzophenone; the diol chain extender is bisphenol-A; and the first linker moiety is phosgene.

The reaction that forms the photoactive additive can further comprise a second end-capping agent that does not contain a ketone group. In embodiments, the second end-capping agent is selected from the group consisting of phenol, p-t-butylphenol, p-cumylphenol, octylphenol, and p-cyanophenol.

The photoactive additive may have from about 0.5 mol % to about 5.0 mole % of endcaps derived from the monohydroxybenzophenone. The photoactive additive can have a weight-average molecular weight of between 17,000 and 80,000 Daltons, as measured by gel permeation chromatography using a UV-VIS detector and polycarbonate standards.

Sometimes, the reaction that forms the photoactive additive further comprises a secondary linker moiety having at least three functional groups, each of which can react with a linking group of the first linker moiety.

The additive may have a weight average molecular weight of 15,000 or greater, measured prior to crosslinking.

The crosslinked layer can further comprise a polymeric base resin which is different from the photoactive additive. The crosslinked layer can further comprise a flame retardant.

Also disclosed herein are processes for making a thin walled product having improved scratch resistance, comprising: producing a film layer containing a photoactive additive, wherein the additive is a cross-linkable polycarbonate resin containing a photoactive group derived from a monohydroxybenzophenone; and exposing the film layer to ultraviolet light to induce crosslinking in the film layer and obtain the thin walled product having improved scratch resistance.

The film layer can also be co-extruded with a substrate resin that forms a substrate resin bonded to the film layer. The thin walled product may have a scratch rating of B or harder according to ASTM D3363. The film layer can further comprise a polymeric base resin.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
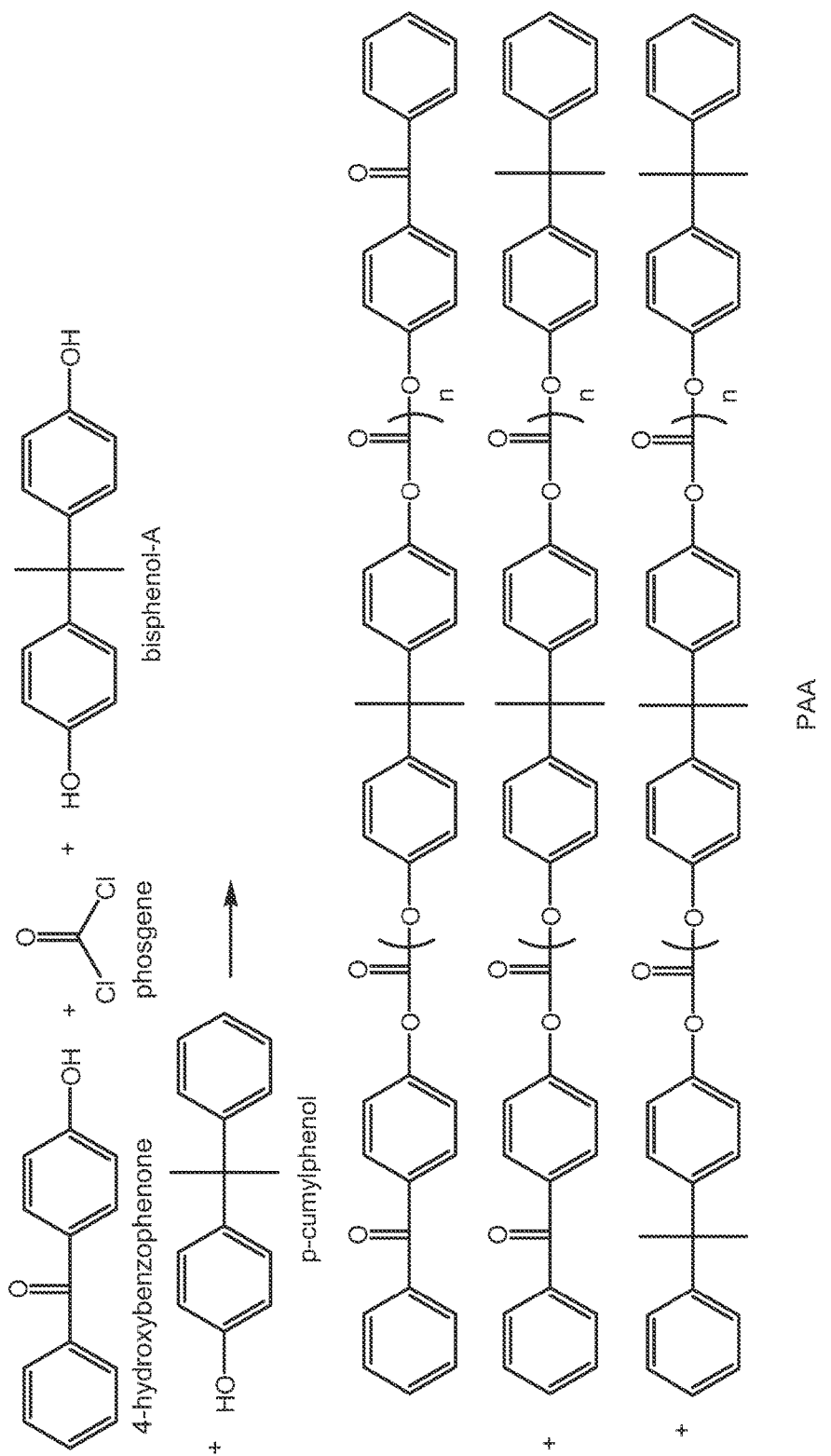
FIG. 1 illustrates the formation of a photoactive additive (oligomer/polymer) from a monofunctional photoactive moiety, a first linker moiety, a diol chain extender, and an endcapping agent.

The present disclosure may be understood more readily by reference to the following detailed description of desired embodiments and the examples included therein. In the following specification and the claims which follow, reference will be made to a number of terms which shall be defined to have the following meanings.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to an linear or branched array of atoms that is not aromatic. The backbone of an aliphatic group is composed exclusively of carbon. The aliphatic group may be substituted or unsubstituted. Exemplary aliphatic groups include, but are not limited to, methyl, ethyl, isopropyl, hexyl, and cyclohexyl.

The term "aromatic" refers to a radical having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "ester" refers to a radical of the formula —CO—O—, wherein the carbon atom and the oxygen atom are both covalently bonded to carbon atoms.

The term "carbonate" refers to a radical of the formula —O—CO—O—, wherein the oxygen atoms are both covalently bonded to carbon atoms. Note that a carbonate group is not an ester group, and an ester group is not a carbonate group.

The term "hydroxyl" refers to a radical of the formula —OH, wherein the oxygen atom is covalently bonded to a carbon atom The terms "carboxy" or "carboxyl" refers to a radical of the formula —COOH, wherein the carbon atom is covalently bonded to another carbon atom. It should be noted that for the purposes of this disclosure, a carboxyl group may be considered as having a hydroxyl group. However, it should be noted that a carboxyl group can participate in certain reactions differently from a hydroxyl group.

The term "anhydride" refers to a radical of the formula —CO—O—CO—, wherein the carbonyl carbon atoms are covalently bonded to other carbon atoms. An anhydride can be considered as being equivalent to two carboxyl groups.

The term "acid halide" refers to a radical of the formula —CO—X, wherein the carbon atom is covalently bonded to another carbon atom.

The term "alkyl" refers to a radical composed entirely of carbon atoms and hydrogen atoms which is fully saturated. The alkyl radical may be linear, branched, or cyclic.

The term "aryl" refers to an aromatic radical that is composed exclusively of carbon and hydrogen. Exemplary aryl groups include phenyl, naphthyl, and biphenyl. Note that "aryl" is a subset of aromatic.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine.

The term "alkoxy" refers to an alkyl radical which is attached to an oxygen atom, i.e. —O—$C_nH_{2n+1}$.

The term "aryloxy" refers to an aryl radical which is attached to an oxygen atom, e.g. —O—$C_6H_5$.

The term "hydrocarbon" refers to a radical which is composed exclusively of carbon and hydrogen. Both alkyl and aryl groups are considered hydrocarbon groups.

The term "alkenyl" refers to a radical composed entirely of carbon atoms and hydrogen atoms which contains at least one carbon-carbon double bond that is not part of an aryl or heteroaryl structure. The alkenyl radical may be linear, branched, or cyclic. An exemplary alkenyl radical is vinyl (—CH=$CH_2$).

The term "alkenyloxy" refers to a alkenyl radical which is attached to an oxygen atom, e.g. —O—CH=$CH_2$.

The term "arylalkyl" refers to an aryl radical which is attached to an alkyl radical, e.g. benzyl (—$CH_2$—$C_6H_5$).

The term "alkylaryl" refers to an alkyl radical which is attached to an aryl radical, e.g. tolyl (—$C_6H_4$—$CH_3$).

The term "amino" refers to a radical of the formula R—$NH_2$, wherein R is a carbon atom. For purposes of this disclosure, the amino group is a primary amino group, i.e. contains two hydrogen atoms.

The term "copolymer" refers to a polymer derived from two or more structural unit or monomeric species, as opposed to a homopolymer, which is derived from only one structural unit or monomer.

The terms "Glass Transition Temperature" or "Tg" refer to the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius. The glass transition temperatures (Tg) described herein are measures of heat resistance of, for example, polycarbonate and polycarbonate blends. The Tg can be determined by differential scanning calorimetry, for example by using a TA Instruments Q1000 instrument, for example, with setting of 20° C./min ramp rate and 40° C. start temperature and 200° C. end temperature.

The term "halo" means that the substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

The term "haze" refers to the percentage of transmitted light, which in passing through a specimen deviates from the incident beam by forward scattering. Percent (%) haze may be measured according to ASTM D 1003-07.

The term "Melt Volume Rate" (MVR) or "Melt Flow Rate (MFR)" refers to the flow rate of a polymer in a melt phase as determined using the method of ASTM D1238-10. The MVR of a molten polymer is measured by determining the amount of polymer that flows through a capillary of a specific temperature over a specified time using standard weights at a fixed temperature. MVR is expressed in cubic centimeter per 10 minutes, and MFR is expressed in grams per 10 minutes. The higher the MVR or MFR value of a polymer at a specific temperature, the greater the flow of that polymer at that specific temperature.

The term "Percent transmission" or "% transmission" refers to the ratio of transmitted light to incident light, and may be measured according to ASTM D 1003-07.

"Polycarbonate" as used herein refers to an oligomer or a polymer comprising residues of one or more monomers, joined by carbonate linkages.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to form such stable covalent bonds.

The present disclosure refers to "polymers," "oligomers", and "compounds". A polymer is a large molecule composed of multiple repeating units chained together, the repeating units being derived from a monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units.

For purposes of this disclosure, the term "oligomer" refers to such molecules having a weight average molecular weight of less than 15,000, and the term "polymer" refers to molecules having a weight average molecular weight of 15,000 of more, as measured by GPC using polycarbonate molecular weight standards. In contrast, for a compound, all molecules will have the same molecular weight. Compared to a polymer, a compound is a small molecule. These molecular weights are measured prior to any UV exposure.

Additives

The present disclosure relates to photoactive additives (PAA), and to polymeric blends containing such additives which can be used to make a film layer for a thin walled product, such as a film, sheet, or thin walled article. When the photoactive additive is added to one or more base resins and is then exposed to the appropriate wavelength of light, the resulting composition will have improved anti-drip and flame retardant properties compared to the base resins alone or to the composition prior to the light exposure. For example, the chemical resistance, propensity to drip during burning, or the propensity to form a hole when exposed to a flame can be improved. In addition, the scratch and mar maybe improved.

Generally, the photoactive additives (PAA) of the present disclosure include photoactive moieties that are covalently linked together through a first linker moiety and possibly a secondary linker moiety. The photoactive moieties contain a photoactive ketone group that, when exposed to the appropriate wavelength(s) of ultraviolet light, will form a stable covalent bond between the PAA and the polymeric resin. The PAA should be stable at conventional blending, forming, and processing temperatures (i.e. stable at 350° C. or above). The PAA also should not induce the degradation of the polymeric resin with which it is blended.

The term "photoactive moiety" refers to a moiety that, when exposed to ultraviolet light of the appropriate wavelength, crosslinks with another molecule. Thus, for example, the bisphenol-A monomer in a bisphenol-A homopolymer would not be considered a photoactive moiety, even though photo-Fries rearrangement can occur upon exposure to light, because the atoms do not participate in crosslinking but merely in rearrangement of the polymer backbone.

The photoactive additive is formed from a reaction mixture containing at least a first photoactive moiety and a first linker moiety. The photoactive moiety comprises (i) a ketone group and (ii) only one phenolic group. The linker moiety comprises a plurality of linking groups that can react with the functional group(s) of the photoactive moiety. The reaction product is the photoactive additive (PAA). The molar ratio of the photoactive moiety to the linker moiety can be from 1:2 to 1:200. A second end-capping agent may also be included. As desired, a diol chain extender can also be included. The second end-capping agent and the chain extender do not have photoactive properties.

The term "ketone group" refers to a carbonyl group (—CO—) that is bonded to two other carbon atoms (i.e. —R—CO—R'—). The two other carbon atoms can be in an aliphatic group or in an aromatic group. An ester group and a carboxylic acid group are not considered to be a ketone group because the carbonyl group is bonded to one carbon atom and an oxygen atom.

The term "phenolic group" refers to a phenyl group (—$C_6H_4$—) with a hydroxyl group (—OH) covalently bonded to a carbon atom in the phenyl group.

The first photoactive moiety acts as an end-capping agent. The photoactive additive may comprise about 0.5 mole % to about 5.0 mole % endcap groups derived from the first photoactive moiety. Examples of such photoactive end-capping agents include those having the structure of one of Formulas (1), (3), or (5)-(10):

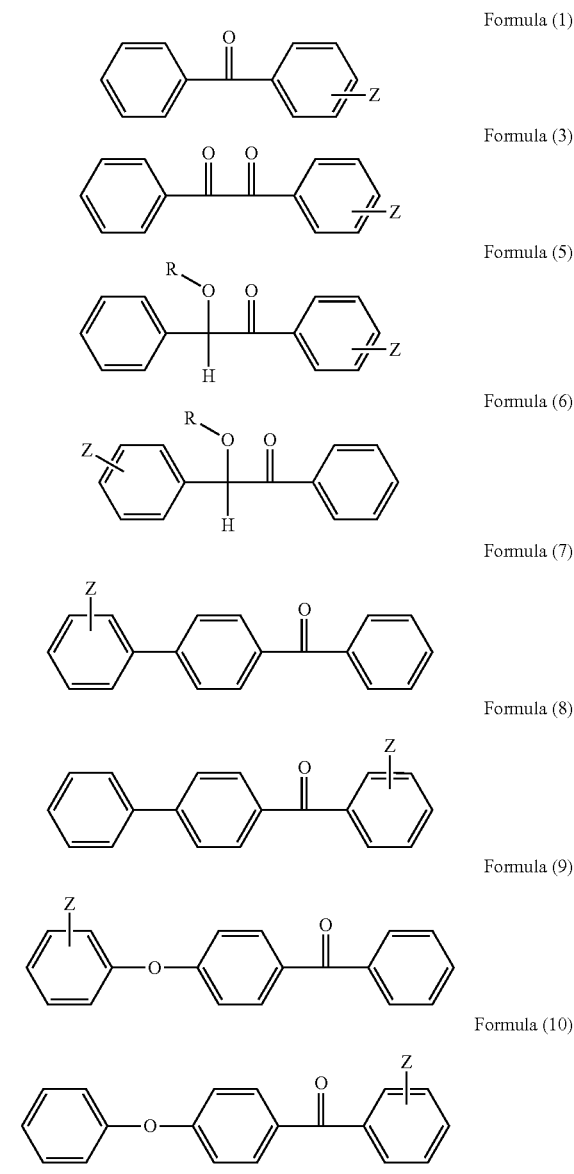

wherein Z is hydroxyl, amino, or —COY, wherein Y is hydroxyl, alkoxy, aryloxy, or halogen; and R is H, alkyl, or aryl.

The compound of Formula (I) is a (Z)benzophenone. The compound of Formula (3) is a 1-(Z)phenyl-2-phenylethane-1,2-dione. The compound of Formula (5) is a 1-((Z)phenyl)-2-hydrocarboxy-2-phenylethanone. The compound of Formula (6) is a 2-((Z)phenyl)-2-hydrocarboxy-1-phenylethanone. The compound of Formula (7) is a 4-((Z)phenyl)-benzophenone. The compound of Formula (8) is a 4-(Z)-4'-phenylbenzophenone. The compound of Formula (9) is a 4-[((Z))phenoxy]-benzophenone. The compound of Formula (10) is a 4-(Z)-4'-phenoxy-benzophenone. In this paragraph, (Z) represents the functional group.

In some other embodiments of a photoactive end-capping agent, the R and R' groups attached to the ketone group form a ring structure. In such embodiments, the aromatic rings can include both aryl rings or heteroaryl rings. Examples of such photoactive end-capping agents include those having the structure of one of Formulas (13)-(14):

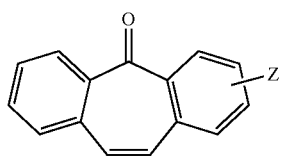

Formula (13)

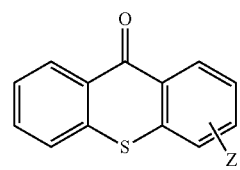

Formula (14)

wherein Z is hydroxyl, amino, or —COY, wherein Y is hydroxyl, alkoxy, aryloxy, or halogen.

The compound of Formula (13) is a (Z)dibenzo[1,3-e:1',2'-f][7]annulen-11-one. The compound of Formula (14) is a (Z)thioxanthen-9-one. In this paragraph, (Z) represents the functional group.

In particular embodiments, the first photoactive moiety is a monohydroxybenzophenone. Suitable monohydroxybenzophenone chain-stoppers include, but are not limited to, 2-hydroxybenzophenone, 3-hydroxybenzophenone, 4-hydroxybenzophenone, 4-hydroxybenzoylbenzophenone, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, and 2-hydroxy-4-methoxybenzophenone-5-sulfonic acid. In preferred embodiments, the monohydroxybenzophenone chain stopper is a 2-hydroxybenzophenone, 3-hydroxybenzophenone, or 4-hydroxybenzophenone, each of which may be further substituted with one or more additional substituents, provided the monohydroxybenzophenone still functions as a chain-stopper. In further preferred embodiments, the monohydroxybenzophenone is 4-hydroxybenzophenone.

The photoactive moiety is reacted with one or more first linker moieties. At least one of the linker moieties comprises a plurality of linking groups that can react with the phenolic group of the photoactive moiety. Examples of such functional groups include a carboxylic acid (and anhydrides thereof), an acyl halide, an alkyl ester, and an aryl ester. The linking groups can be joined to an aliphatic group or an aromatic group which serves as a "backbone" for the linker moiety. In particular embodiments, the first linker moiety can have two, three, four, or even more linking groups.

Some examples of first linker moieties which have two linking groups and can react with the photoactive moieties include those having the structure of one of Formulas (30), (32), or (33):

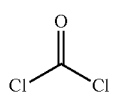

Formula (30)

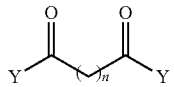

Formula (32)

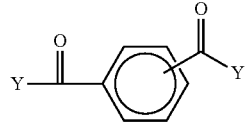

Formula (33)

where Y is hydroxyl, halogen, alkoxy, or aryloxy; and where n is 1 to 20. It should be noted that Formula (33) encompasses isophthalic acid and terephthalic acid. It should be noted that Formula (33) encompasses isophthalic acid and terephthalic acid. The notation of Formula (33) indicates that the aliphatic backbone may have any conformation and that the Z groups may be attached to any carbon atom in the aliphatic backbone.

Some examples of linker moieties which have three linking groups and can react with the photoactive moieties include those having the structure of one of Formulas (34)-(36):

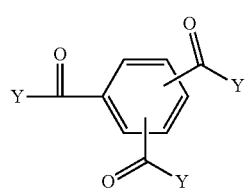

Formula (34)

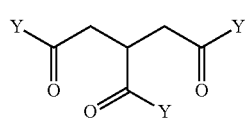

Formula (35)

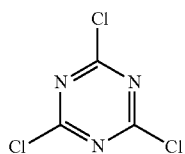

Formula (36)

wherein Y is hydroxyl, halogen, alkoxy, or aryloxy.

Some examples of linker moieties which have four linking groups and can react with the photoactive moieties include those having the structure of one of Formulas (37), (38), or (40):

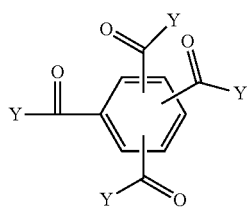

Formula (37)

Formula (38)

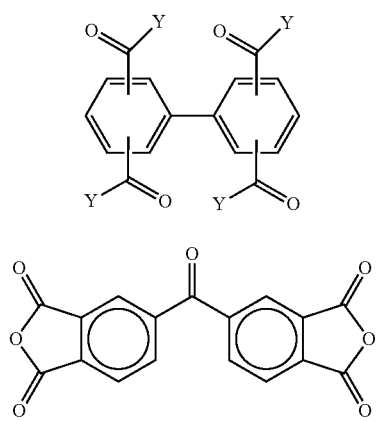

Formula (40)

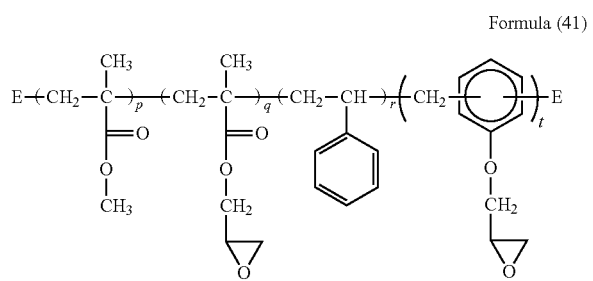

wherein Y is hydroxyl, alkoxy, aryloxy, or halogen; and where n is 1 to 20.

In some embodiments, linking groups can be provided by short oligomers, including oligomers containing glycidyl methacrylate monomers with styrene or methacrylate monomers, or epoxidized novolac resins. These oligomers can permit the desired number of functional groups to be provided. Such oligomers are generalized by the structure of Formula (41):

Formula (41)

where E is hydrogen or an endcapping agent, p is the number of methacrylate monomers, q is the number of methacrylate monomers, r is the number of styrene monomers, and t is the number of epoxidized novolac (phenol-formaldehyde) monomers. Generally, p+q+r+t≤20. When the oligomer contains glycidyl methacrylate monomers with styrene or methacrylate monomers, generally t=0 and q≥1. Similarly, for novolac resins, p=q=r=0. The epoxy groups can be reacted with the phenolic group of the photoactive moiety.

If desired, the photoactive additive can be formed from a reaction mixture containing the photoactive moiety, the first linker moiety, and one or more diol chain extenders. The chain extender is a molecule that contains only two functional groups and is not photoactive when exposed to light. The chain extender can be used to provide a desired level of miscibility when the additive is mixed with the polymeric resin.

A first exemplary chain extender is a bisphenol of Formula (B):

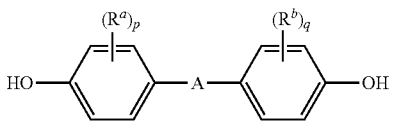

wherein $R^a$ and $R^b$ each represent a halogen atom or a monovalent hydrocarbon group and may be the same or different; p and q are each independently integers of 0 to 4; and A represents one of the groups of formula (B-1):

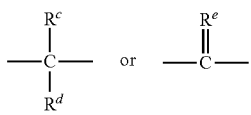

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that may be represented by Formula (B) include 1,1-bis(4-hydroxyphenyl) methane, 1,1-bis(4-hydroxyphenyl)ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; 4,4'-(1-phenylethane-1,1-diyl)diphenol or 1,1-bis(4-hydroxyphenyl)-1-phenyl-ethane (bisphenol-AP); and 1,1-bis(4-hydroxyphenyl)-3,3,5-trimethylcyclohexane (bisphenol TMC).

A second exemplary chain extender is a bisphenol of Formula (C):

wherein each $R^k$ is independently a $C_{1-10}$ hydrocarbon group, and n is 0 to 4. The halogen is usually bromine. Examples of compounds that may be represented by Formula (C) include resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone.

A third exemplary chain extender is a bisphenolpolydiorganosiloxane of Formula (D-1) or (D-2):

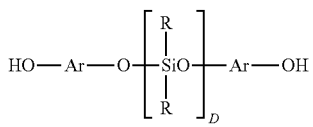

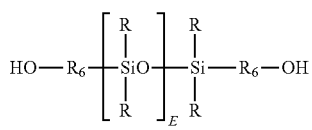
(D-2)

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, specifically about 2 to about 500, more specifically about 10 to about 75.

Specific examples of Formulas (D-1) or (D-2) are illustrated below as Formulas (D-a) through (D-d):

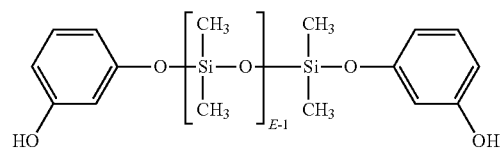
(D-a)

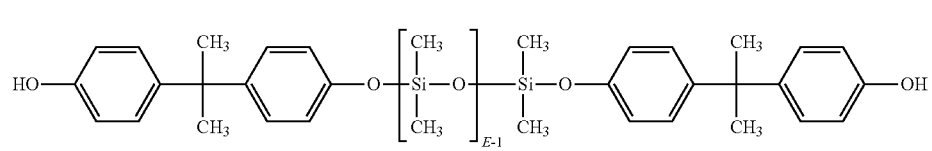
(D-b)

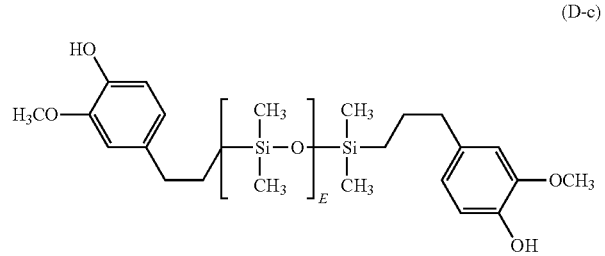
(D-c) (D-d)

where E is an average value from 10 to 200.

A fourth exemplary chain extender is an aliphatic compound of Formula (E):

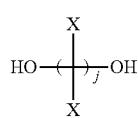
(E)

wherein each X is independently hydrogen, halogen, or alkyl; and j is an integer from 1 to 20. Examples of an aliphatic compound include ethylene glycol, propanediol, 2,2-dimethyl-propanediol, 1,6-hexanediol, and 1,12-dodecanediol.

A fifth exemplary diol chain extender is a dihydroxy compound of Formula (F), which may be useful for high heat applications:

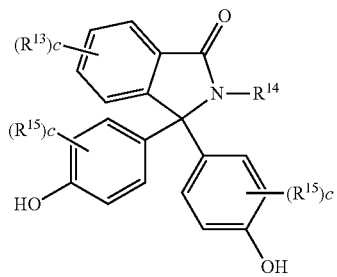
(F)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0. Compounds of Formula (F) include 3,3-bis(4-hydroxyphenyl)-2-phenylisoindolin-1-one (PPPBP).

Other dihydroxy compounds (i.e. diol chain extenders) that might impart high Tgs to the polycarbonate as a copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (G) for high heat applications:

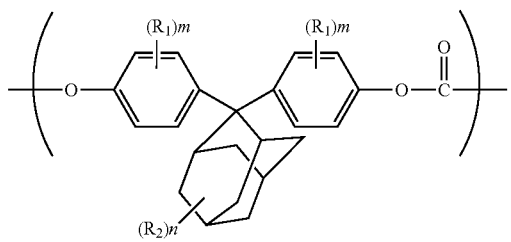

(G)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (H) for high heat applications:

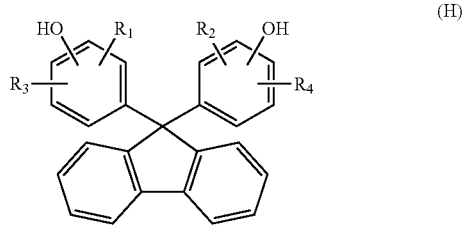

(H)

wherein $R_1$ to $R_4$ are each independently a hydrogen atom, a hydrocarbon group with 1 to 9 carbon atoms which may contain an aromatic group, or a halogen atom.

Another diol chain extender that could be used is an isosorbide. A monomer unit derived from isosorbide may be an isorbide-bisphenol unit of Formula (I):

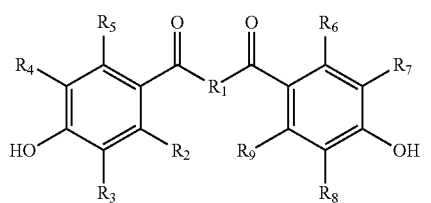

(I)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (I-a):

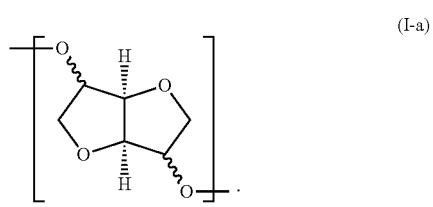

(I-a)

The isosorbide unit may be derived from an isosorbide, a mixture of isosorbide, a mixture of isomers of isosorbide, and/or from individual isomers of isosorbide. The stereochemistry for the isosorbide-based carbonate units of Formula (I) is not particularly limited. These diols may be prepared by the dehydration of the corresponding hexitols. Hexitols are produced commercially from the corresponding sugars (aldohexose). Aliphatic diols include 1,4:3,6-dianhydro-D glucitol; 1,4:3,6-dianhydro-D mannitol; and 1,4:3, 6-dianhydro-L iditol; and any combination thereof. Isosorbides are available commercially from various chemical suppliers including Cargill, Roquette, and Shanxi. The isosorbide-bisphenol may have a pKa of between 8 and 11.

As previously explained, a first photoactive moiety is reacted with a first linker moiety to obtain the photoactive additive. In some embodiments, a secondary linker moiety is included in the reaction mixture. The secondary linker moiety has at least three functional groups, each of which can react with the linking groups of the first linker moiety. Generally, the functional groups of the secondary linker moiety are hydroxyl groups.

Some examples of secondary linker moieties which have three functional groups and can react with the first linker moiety include those having the structure of one of Formulas (43)-(46):

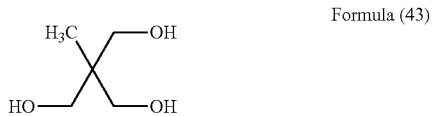

Formula (43)

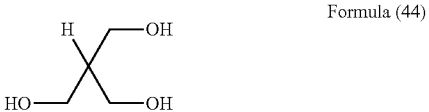

Formula (44)

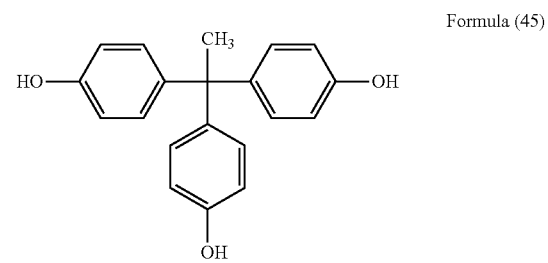

Formula (45)

Formula (46)

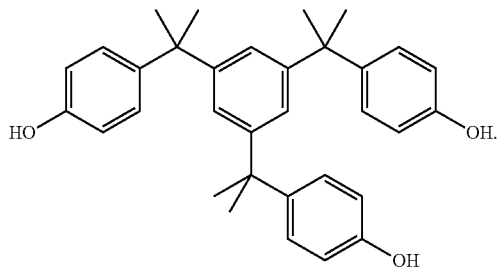

Some examples of secondary linker moieties which have four functional groups and can react with the first linker moiety include those having the structure of one of Formulas (47)-(48):

Formula (47)

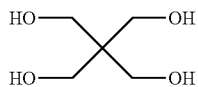

Formula (48)

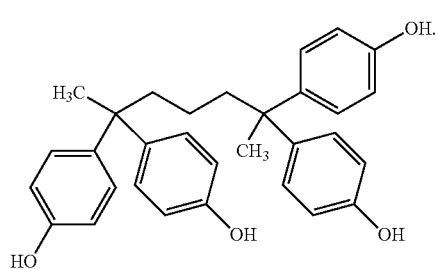

In some embodiments, the secondary linker moiety can be an oligomer, made from an epoxidized novolac monomer. These oligomers can permit the desired number of functional groups to be provided. Such oligomers are generalized by the structure of Formula (49):

Formula (49)

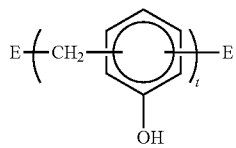

wherein E is hydrogen or an endcapping agent; and t is an integer from 1 to 20.

If desired, a second end-capping agent can be used in addition to the photoactive moiety to terminate any polymer chains of the photoactive additive. The second end-capping agent (i.e. chain stopper) is a monohydroxy compound, a mono-acid compound, or a mono-ester compound. Exemplary endcapping agents include phenol, p-cumylphenol (PCP), resorcinol monobenzoate, p-tert-butylphenol, octylphenol, p-cyanophenol, and p-methoxyphenol. The term "end-capping agent" is used herein to denote a compound that is not photoactive when exposed to light. For example, the end-capping agent does not contain a ketone group. The photoactive additive may comprise about 0.5 mole % to about 5.0 mole % endcap groups derived from the second end-capping agent.

The photoactive additives of the present disclosure can be a compound, an oligomer, or a polymer. The oligomer has a weight average molecular weight (Mw) of less than 15,000, including 10,000 or less. The polymeric photoactive additives of the present disclosure have a Mw of 15,000 or higher. In particular embodiments, the Mw is between 17,000 and 80,000 Daltons, or between 17,000 and 35,000 Daltons. These molecular weights are measured prior to any UV exposure. The Mw may be varied as desired. Oligomers with relatively higher Mw's generally retain their mechanical properties better, while oligomers with relatively lower Mw's generally have better flow properties. In some particular embodiments, the Mw of the photoactive additives is about 5,000 or less. During melt processing, such oligomers are more likely to rise to the surface of the article. Long chain aliphatic diols ($C_6$ or higher) can also be used for this purpose. This may increase the concentration of the additive at the surface, and thus increase the crosslinking density at the surface upon exposure to UV light as well.

The resulting photoactive additive (PAA) may be an oligomer or a polymer with a weight average molecular weight and a polydispersity index. The product resulting from the reaction in FIG. 1 is illustrative of such photoactive additives. Here, bisphenol-A is reacted with phosgene, 4-hydroxybenzophenone, and p-cumylphenol (endcap) to obtain the photoactive additive. Some chains will have two 4-hydroxybenzophenone endcaps, some will have only one 4-hydroxybenzophenone endcap, and some will have none, distributed in a statistical fashion.

Figure 2:
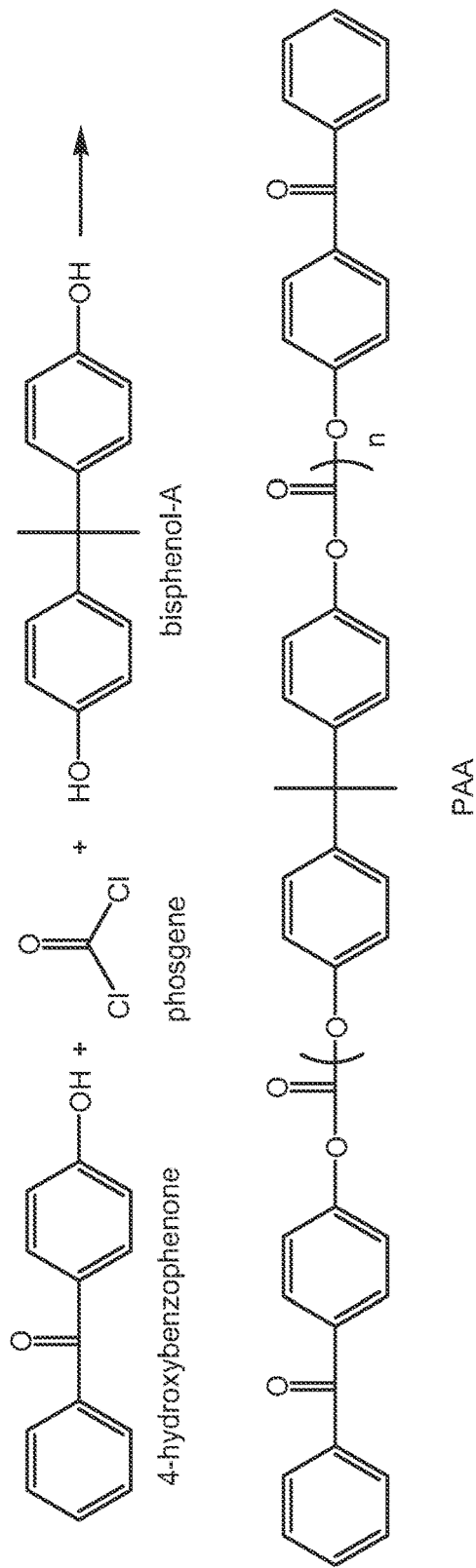
FIG. 2 illustrates the formation of a photoactive additive (oligomer/polymer) from a first photoactive moiety, a first linker moiety, and a diol chain extender.

Another example of a photoactive additive formed from a first photoactive moiety, a first linker moiety, and a diol chain extender is seen in FIG. 2. Here, 4-hydroxybenzophenone (first photoactive moiety) is reacted with phosgene (first linker moiety) and bisphenol-A (chain extender) to obtain the photoactive additive. The resulting photoactive additive (PAA) may be an oligomer or a polymer with a weight average molecular weight and a polydispersity index.

Figure 3:
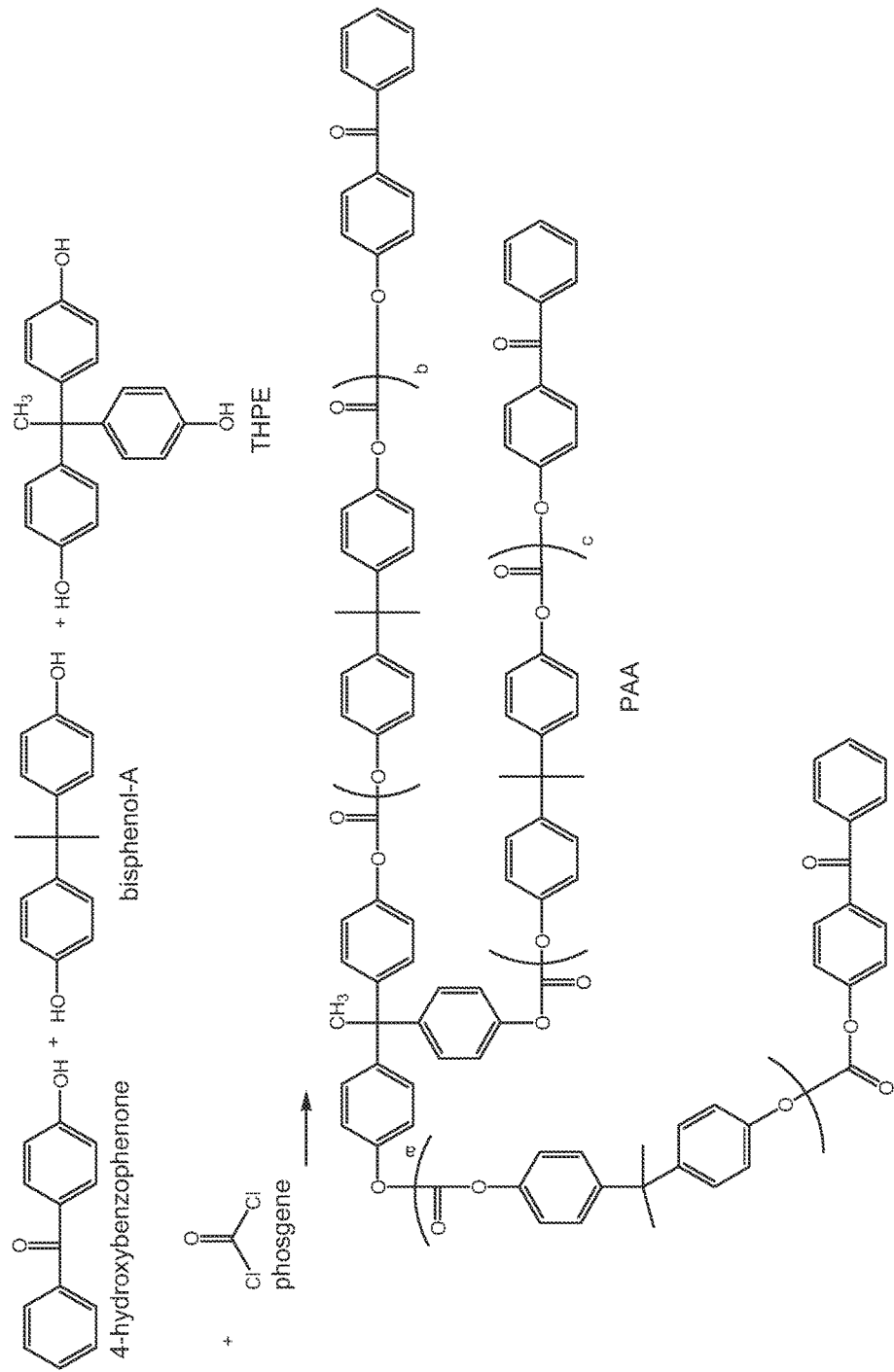
FIG. 3 illustrates the formation of a photoactive additive (oligomer/polymer) from a first photoactive moiety, a first linker moiety, a diol chain extender, and a secondary linker moiety.

Some photoactive additives of the present disclosure can be formed from the reaction of a first photoactive moiety, a diol chain extender, a first linker moiety, and a secondary linker moiety. Such a reaction is seen in FIG. 3. Here, 4-hydroxybenzophenone, bisphenol-A, phosgene, and THPE are reacted to obtain the photoactive additive. The resulting photoactive additive (PAA) may be an oligomer or a polymer with a weight average molecular weight and a polydispersity index.

Figure 4:
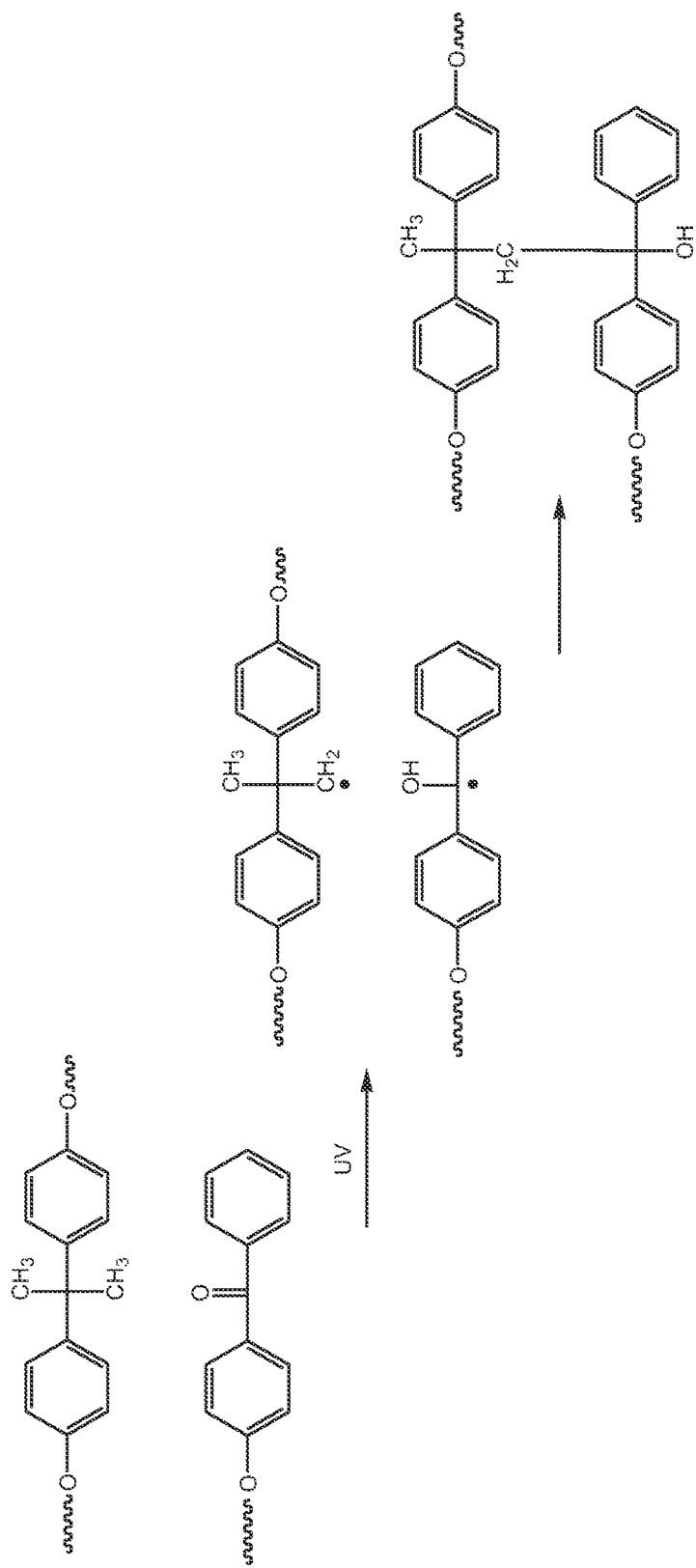
FIG. 4 illustrates the crosslinking mechanism of the photoactive additive.

One crosslinking mechanism of the additives is believed to be due to hydrogen abstraction by the ketone group from an alkyl group that acts as a hydrogen donor and subsequent coupling of the resulting radicals. This mechanism is illustrated in FIG. 4 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of an abstractable hydrogen is critical for this reaction to occur. Other mechanisms may occur after the initial abstraction event with base resins containing unsaturated bonds or reactive side groups.

In particular embodiments, the photoactive additives (PAAs) disclosed herein are cross-linkable polycarbonates comprising monohydroxybenzophenone-derived endcaps (i.e. of Formula (1)). These polycarbonates, prior to crosslinking, can be provided as thermally stable high melt-flow polymers, and can thus be used to fabricate a variety of thin-walled articles (e.g., 3 mm or less). These articles may subsequently be treated (e.g., with UV-radiation) to affect cross-linking, thereby providing thin-walled materials that meet desired performance requirements (e.g., 5VA performance, chemical resistance, transparency). The cross-linked materials, in addition to scratch resistance, may retain or exhibit superior flame resistance, chemical resistance, and/or mechanical properties (e.g., impact resistance, ductility) as compared to the composition prior to cross-linking.

The monohydroxybenzophenone endcaps of the cross-linkable polycarbonates provide a reactive functional group for cross-linking the polycarbonates. For example, treatment of a cross-linkable polycarbonate with a suitable dose of ultraviolet radiation, as further described herein, may initiate cross-linking reaction between the monohydroxybenzophenone carbonyl carbon and a carbon atom of another functional group (e.g., a methylene carbon atom, such as in bisphenol-A) in the same polymer or another polymer in the composition.

The cross-linkable polycarbonates of the present disclosure include homopolycarbonates, copolymers comprising different moieties in the carbonate (referred as "copolycarbonates"), copolymers comprising carbonate units and other types of polymer units such as polyester units, polysiloxane units, and combinations comprising at least one homopolycarbonate and copolycarbonate. For reference, the term "dipolymer" refers to copolymers derived specifically from two different monomers, and the term "terpolymer" refers to copolymers derived specifically from three different monomers If the cross-linkable polycarbonate is a copolymer, the monomers may be randomly incorporated into the polycarbonate. A random copolymer may have several block sequences and alternate sequences that follow a statistical distribution. In a random x:(1−x) copolymer, wherein x is the mole percent of a first monomer and 1−x is the mole percent of the other monomers, one can calculate the distribution of each monomer using peak area values determined by $^{13}C$ NMR, for example. The copolymer can be an alternating copolymer with alternating I and O units (-I-O-I-O-I-O-I-O-), or I and O units arranged in a repeating sequence (e.g. a periodic copolymer having the formula: (I-O-I-O-O-I-I-I-I-O-O-O)n). The cross-linkable polycarbonate copolymer may be a statistical copolymer in which the sequence of monomer residues follows a statistical rule. The copolymer may also be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

Suitable monohydroxybenzophenone chain-stoppers include, but are not limited to, 2-hydroxybenzophenone, 3-hydroxybenzophenone, 4-hydroxybenzophenone, 4-hydroxybenzoylbenzophenone, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, and 2-hydroxy-4-methoxybenzophenone-5-sulfonic acid. In one preferred embodiment, the monohydroxybenzophenone chain stopper is a 2-hydroxybenzophenone, 3-hydroxybenzophenone, or 4-hydroxybenzophenone, each of which may be further substituted with one or more additional substituents, provided the monohydroxybenzophenone still functions as a chain-stopper. In another preferred embodiment, the monohydroxybenzophenone is 4-hydroxybenzophenone.

The cross-linkable polycarbonates (also referred to as "non-cross-linked polycarbonates") may comprise about 0.5 mol % to about 5 mol % endcap groups derived from a monohydroxybenzophenone, about 1 mol % to about 3 mol % endcap groups derived from a monohydroxybenzophenone, about 1.7 mol % to about 2.5 mol % endcap groups derived from a monohydroxybenzophenone, about 2 mol % to about 2.5 mol % endcap groups derived from a monohydroxybenzophenone, or about 2.5 mol % to about 3.0 mol % endcap groups derived from a monohydroxybenzophenone. The cross-linkable polycarbonates may have a monohydroxybenzophenone derived endcap content of: 0.5 mol %, 0.6 mol %, 0.7 mol %, 0.8 mol %, 0.9 mol %, 1.0 mol %, 1.1 mol %, 1.2 mol %, 1.3 mol %, 1.4 mol %, 1.5 mol %, 1.6 mol %, 1.7 mol %, 1.8 mol %, 1.9 mol %, 2.0 mol %, 2.1 mol %, 2.2 mol %, 2.3 mol %, 2.4 mol %, 2.5 mol %, 2.6 mol %, 2.7 mol %, 2.8 mol %, 2.9 mol %, 3.0 mol %, 3.1 mol %, 3.2 mol %, 3.3 mol %, 3.4 mol %, 3.5 mol %, 3.6 mol %, 3.7 mol %, 3.8 mol %, 3.9 mol %, 4.0 mol %, 4.1 mol %, 4.2 mol %, 4.3 mol %, 4.4 mol %, 4.5 mol %, 4.6 mol %, 4.7 mol %, 4.8 mol %, 4.9 mol %, or 5.0 mol %.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons]. In certain embodiments, the cross-linkable polycarbonates have weight average molecular weights of about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. In additional embodiments, the cross-linkable polycarbonates have a Mw of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm, or alternatively using a refractive index detector. Samples may be prepared at a concentration of about 1 mg/ml, and eluted at a flow rate of about 1.0 ml/min.

The cross-linkable polycarbonates of the present disclosure may have a polydispersity index (PDI) of about 2.0 to about 5.0, about 2.0 to about 3.0, or about 2.0 to about 2.5. The PDI is measured prior to any UV exposure.

The cross-linkable polycarbonates of the present disclosure may have a melt flow rate (often abbreviated MFR), which measures the rate of extrusion of a composition through an orifice at a prescribed temperature and load. In certain embodiments, the polycarbonates may have an MFR of 1 to 40 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238 method, 1.2 kg load, 300° C. temperature, 360 second dwell.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a biocontent of 2 wt % to 90 wt %; 5 wt % to 25 wt %; 10 wt % to 30 wt %; 15 wt % to 35 wt %; 20 wt % to 40 wt %; 25 wt % to 45 wt %; 30 wt % to 50 wt %; 35 wt % to 55 wt %; 40 wt % to 60 wt %; 45 wt % to 65 wt %; 55 wt % to 70% wt %; 60 wt % to 75 wt %; 50 wt % to 80 wt %; or 50 wt % to 90 wt %. The biocontent may be measured according to ASTM D6866.

The cross-linkable polycarbonates of the present disclosure may have a modulus of elasticity of greater than or equal to 2200 megapascals (MPa), greater than or equal to 2310 MPa, greater than or equal to 2320 MPa, greater than or equal to 2330 MPa, greater than or equal to 2340 MPa, greater than or equal to 2350 MPa, greater than or equal to 2360 MPa, greater than or equal to 2370 MPa, greater than or equal to 2380 MPa, greater than or equal to 2390 MPa, greater than or equal to 2400 MPa, greater than or equal to 2420 MPa, greater than or equal to 2440 MPa, greater than or equal to 2460 MPa, greater than or equal to 2480 MPa, greater than or equal to 2500 MPa, or greater than or equal to 2520 MPa as measured by ASTM D 790 at 1.3 mm/min, 50 mm span.

In embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790.

The cross-linkable polycarbonates of the present disclosure may have a tensile strength at break of greater than or equal to 60 megapascals (MPa), greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, greater than or equal to 75 MPa as measured by ASTM D 638 Type I at 50 mm/min.

The cross-linkable polycarbonates of the present disclosure may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D 256-10.

The cross-linkable polycarbonates of the present disclosure may have a notched Izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 J/m, greater than or equal to 950 J/m, or greater than or equal to 1000 J/m, measured at 23° C. according to ASTM D 256.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D 648 at 1.82 MPa, with 3.2 mm thick unannealed mm bar.

The cross-linkable polycarbonates of the present disclosure may have a percent haze value of less than or equal to 10.0%, less than or equal to 8.0%, less than or equal to 6.0%, less than or equal to 5.0%, less than or equal to 4.0%, less than or equal to 3.0%, less than or equal to 2.0%, less than or equal to 1.5%, less than or equal to 1.0%, or less than or equal to 0.5% as measured at a certain thickness according to ASTM D 1003-07. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to 50%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, greater than or equal to 96%, greater than or equal to 97%, greater than or equal to 98%, greater than or equal to 99%, greater than or equal to 99.1%, greater than or equal to 99.2%, greater than or equal to 99.3%, greater than or equal to 99.4%, greater than or equal to 99.5%, greater than or equal to 99.6%, greater than or equal to 99.7%, greater than or equal to 99.8%, or greater than or equal to 99.9%, as measured at certain thicknesses according to ASTM D 1003-07. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioethers, aliphatic polyacetals, aliphatic polycarbonates, C-C linked polymers and polysiloxanes. The soft segments of aliphatic polyesters, aliphatic polyethers, aliphatic polythioeithers, aliphatic polyacetals, aliphatic polycarbonates may be characterized as having Number Average MWs (Mns) of greater than 600.

In certain embodiments, the cross-linkable polycarbonates of the present disclosure do not include units derived from dihydroxybenzophenone monomers, trihydroxybenzophenone monomers, tetrahydroxybenzophenone monomers, or other multiple-hydroxybenzophenone monomers. For example, the following monomer units may be excluded from use in the cross-linkable and cross-linked polycarbonates of the present disclosure: 4,4'-dihydroxybenzophenone, 2,4-dihydroxybenzophenone, and 4-(α,α-bis(4-hydroxyphenyl)ethyl-benzophenone.

In particular embodiments, the non-cross-linked (i.e. cross-linkable) polycarbonate has the structure of Formula (I):

Formula (I)

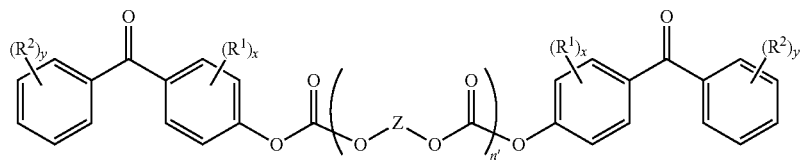

wherein each repeating unit —O—Z-OC(=O)— is independently derived from a carbonate precursor or source and
(i) a monomer having the structure HO-A$_1$-Y$_1$-A$_2$-OH wherein each of A$_1$ and A$_2$ comprise a monocyclic divalent arylene group, and Y$_1$ is a bridging group having one or more atoms; or
(ii) a monomer having the structure

wherein each R$^h$ is independently a halogen atom, a C$_1$-C$_{10}$ hydrocarbyl, or a halogen substituted C$_1$-C$_{10}$ hydrocarbyl, and n is 0 to 4;
R$^1$ is halogen, C$_1$-C$_6$ alkyl, C$_3$-C$_8$ cycloalkyl, aryl, or arylalkyl;
R$^2$ is halogen, C$_1$-C$_6$ alkyl, C$_3$-C$_8$ cycloalkyl, aryl, or arylalkyl;
x is 0, 1, 2, 3, or 4;
y is 0, 1, 2, 3, 4, or 5; and
n' ranges from 29 to 65.

In more specific embodiments, the non-cross-linked (i.e. cross-linkable) polycarbonate has the structure of Formula (II):

Formula (II)

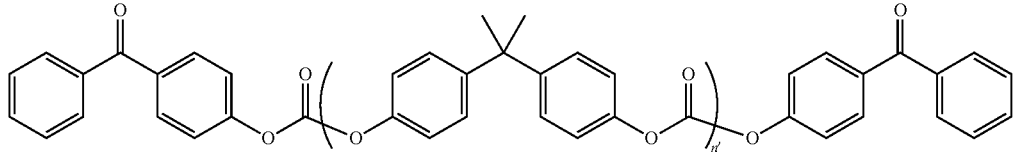

wherein n' ranges from 29 to 65.

In particular embodiments, the photoactive cross-linkable polycarbonate contains about 0.5 mol % of endcaps derived from a monohydroxybenzophenone, and has a weight-average molecular weight (Mw) from 17,000 to 30,000 Daltons. In other specific embodiments, the photoactive cross-linkable polycarbonate contains about 2.5 mol % of endcaps derived from a monohydroxybenzophenone, and has a weight-average molecular weight (Mw) from 24,000 to 31,000 Daltons. In still other definite embodiments, the photoactive cross-linkable polycarbonate has an MVR of 8 to 10 cc/10 min at 300° C./1.2 kg, and can achieve UL94 V0 performance at a thickness of 2.0 mm.

Processes

An interfacial polycondensation polymerization process for bisphenol-A (BPA) based polycarbonates can be used to prepare the photoactive additives (PAAs) of the present disclosure. Although the reaction conditions for interfacial polymerization can vary, an exemplary process generally involves dissolving or dispersing one or more dihydric phenol reactants (e.g. bisphenol-A) in aqueous caustic soda or potash, adding the resulting mixture to a water-immiscible solvent medium, and contacting the reactants with a carbonate precursor (e.g. phosgene) in the presence of a catalyst (e.g. triethylamine, TEA) under controlled pH conditions, e.g., 8 to 11.

This process typically produces polycarbonates with a polydispersity index (PDI) of less than 3. In experiments, benzophenone-containing molecules have exhibited slower reaction kinetics compared to BPA during interfacial polymerization using phosgene. These reduced reaction kinetics have resulted in an increased formation of lower molecular weight compounds and an accompanying increase in the PDI compared to BPA polycarbonate. Conventional polymerization methods have resulted in benzophenone-containing polycarbonate generally having a PDI greater than 3. Increased PDI can indicate an increased low molecular weight fraction in the product. Increased low molecular weight fraction can lead to difficulties in extrusion and injection molding processes by altering the flow behavior or causing the low molecular weight components to volatilize out of the material. A reaction methodology to control the formation of low molecular weight compounds and the resultant PDI would be desirable for the production of oligomers and polymers containing a photoactive moiety, such as a benzophenone.

Four different processes are disclosed herein for producing some embodiments of the photoactive additive which contain carbonate linkages. Each process includes the following ingredients: a monohydroxy compound, a polyhydroxy compound, a carbonate precursor, a tertiary amine catalyst, water, and a water-immiscible organic solvent. The monohydroxy compound is the photoactive moiety. It should be noted that more than one of each ingredient can be used to produce the photoactive additive. For example, both bisphenol-A and trishydroxyphenylethane (THPE) would be considered polyhydroxy compounds (though one is a diol chain extender and the other is a branching agent). Some information on each ingredient is first provided below.

The monohydroxy compound is the photoactive moiety previously described. For example, the monohydroxy compound can have the structure of any one of Formulas (1), (3), or (5)-(10). The monohydroxy compound acts as an endcapping agent, and the previously described endcapping agents (e.g. p-cumyl phenol) could also be used. If desired, more than one monohydroxy compound can be used. In particular embodiments for producing a cross-linkable polycarbonate, the monohydroxy compound is a monohydroxybenzophenone of Formula (1).

The term "polyhydroxy compound" here refers to a compound having two or more hydroxyl groups. In contrast, the term "dihydroxy compound" refers to a compound having only two hydroxyl groups. The polyhydroxy compound can be a dihydroxy compound having the structure of any one of Formulas (B)-(H), which are chain extenders, and include monomers such as bisphenol-A. In addition, the secondary linker moieties of any one of Formulas (43)-(49) can be considered a polyhydroxy compound, and are useful as branching agents. If desired, more than one polyhydroxy compound can be used. In the cross-linkable polycarbonates of the present disclosure, bisphenol-A is typically used.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, dicarboxylic acid, diacid chloride, or any combination thereof. An interfacial polymerization reaction to form carbonate linkages may use phosgene as a carbonate precursor, and is referred to as a phosgenation reaction. Many such carbonate precursors correspond to a structure of Formulas (30), (32), or (33), i.e. a first linker moiety.

A tertiary amine catalyst is used for polymerization. Exemplary tertiary amine catalysts that can be used are aliphatic tertiary amines such as triethylamine (TEA), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group, such as methyltributylammonium chloride.

The most commonly used water-immiscible solvents include methylene chloride, 1,2-dichloroethane, chlorobenzene, toluene, and the like.

In the first process, sometimes referred to as the "upfront" process, all of the hydroxy compounds, catalysts, water, and water-immiscible solvent are combined upfront in a vessel to form a reaction mixture. The reaction mixture is then exposed to the carbonate precursor, for example by phosgenation, to obtain the photoactive additive.

In the second process, also known as the "solution addition" process, the polyhydroxy compound(s), tertiary amine catalyst, water, and water-immiscible solvent are combined in a vessel to form a reaction mixture. The carbonate precursor is then added to this reaction mixture in the vessel over a first time period. During this time period, the monohydroxy compound is added in a controlled manner to the reaction mixture as well, also referred to as programmed addition. The addition of the monohydroxy compound occurs throughout the first time period, rather than as a bolus at one time point (as in the upfront process). Put another way, the carbonate precursor and the monohydroxy compound are added concurrently. The photoactive additive is thus obtained.

The third process is also referred to as a bis-chloroformate or chlorofomate (BCF) process. Chloroformate oligomers are prepared by reacting the carbonate precursor, specifically phosgene, with the polyhydroxy compound(s) in the absence of the tertiary amine catalyst. The chloroformate oligomers can contain a mixture of monochloroformates, bischloroformates, and bisphenol terminated oligomers. After the chloroformate oligomers are generated, the phosgene can optionally be allowed to substantially condense or hydrolyze, then the monohydroxy compound is added to the chloroformate mixture. The reaction is allowed to proceed, and the tertiary amine catalyst is added to complete the reaction.

The fourth process uses a tubular reactor. In the tubular reactor, the monohydroxy compound is pre-reacted with the carbonate precursor (specifically phosgene) to form chloroformates. The water-immiscible solvent is used as a solvent in the tubular reactor. In a separate reactor, the polyhydroxy compound, tertiary amine catalyst, water, and water-immiscible solvent are combined to form a reaction mixture. The chloroformates in the tubular reactor are then fed into the reactor over a first time period along with additional carbonate precursor to complete the reaction.

Second Polymer Resin

A polymeric blend comprising the photoactive additive and a base polymeric resin can be prepared. The photoactive additive may be from 1 wt % to 99 wt % of the blend. The base polymeric resin may also be from 1 wt % to 99 wt % of the blend. Other conventional additives can also be added to the blend (e.g. flame retardants, heat stabilizers, impact modifiers, UV stabilizing additives, mold release agents, colorants, organic and inorganic fillers, gamma-stabilizing agents, etc.).

In some embodiments, the base polymeric resin is incorporated with small amounts of the photoactive additive, either in compound form or oligomeric form. The blend is extruded into pellets, then molded or extruded into articles. The article can then be irradiated with UV light to create crosslinks between the chains, resulting in improved flame retardance, chemical resistance, and scratch resistance.

In other embodiments, the base polymeric resin is blended with the photoactive additive which has a polymeric form. The blend is extruded into pellets, then molded or extruded into articles. The article can then be irradiated with UV light to create crosslinks between the chains, resulting in improved flame retardance and chemical resistance.

The additives, when used, can improve the chemical resistance of the final products. It is contemplated that products can be of any desired shape (e.g. thin walled article, film, sheet, etc.) and be used in many different applications, for example in the medical, automotive, building and construction, graphics, and consumer electronics fields. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; For Pro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Films

In particular, there is a need for plastic films with good mechanical properties, surface finish, transparency, film processability, ink receptivity and scratch resistance for graphic applications. The printed film could be used as-is or further undergo additional processing step such as for in-mold decorating applications. In-mold decoration or insert mold decoration is a popular process of decorating a three-dimensional article. The process involves inserting a decorated and formed film into the molding tool during the injection molding cycle. This decorated and formed film is then bonded with or encapsulated by the molten plastic after the injection cycle. The decoration for the finished part can either be exposed to the environment as "first surface decoration" and/or encapsulated between the substrate and the injected material as "second surface decoration". The three-dimensional decorated article is prepared by creating a printed film. Screen-printing is an example of a suitable technique for producing graphics on film substrates. The film is then thermoformed on a tool that correspond to the three-dimensional shape desired of the final article. The applications are for graphic displays, electronic components, cell phones, automotive displays, etc. Polycarbonate film made from commercial LEXAN® resin is able to meet these application requirements, but is relatively easy to scratch.

Figure 5:
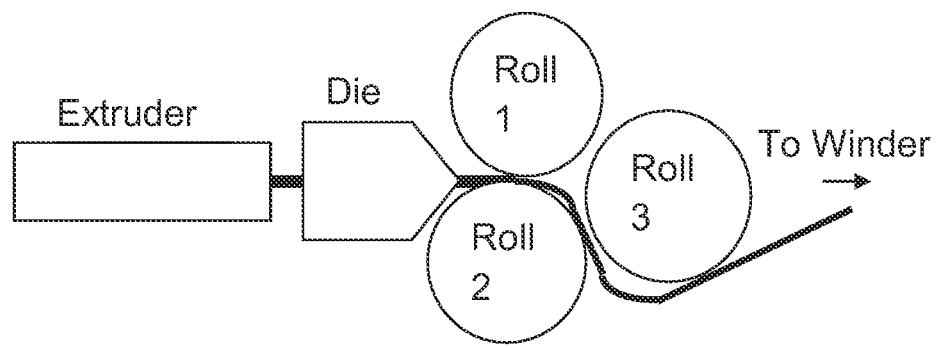
FIG. 5 is a diagram of the components of a calendaring process using only one film.

A crosslinkable film can be made containing the photoactive additive. The film is made via a continuous calendaring extrusion process. When selecting a base resin to combine with the photoactive additive, it is advantageous that the resin's viscosity and melt strength be sufficiently such that when extruded from the die a uniform and stable molten web can be formed. The extrusion calendaring process consists of a melt delivery system via an extruder or a set of extruders for co-extruded film. The extruder supplies the molten resin that is fed into a die which form a molten polymeric web that in turn feed a set of calendaring rolls. A schematic of this process is shown in FIG. 5.

A calendar typically consists of 2 to 4 counter rotating cylindrical rolls. These rolls are typically made from steel or rubber-covered steel, they are internally heated or cooled. The molten web formed by the die is successively squeezed between these rolls. The inter-roll clearances or "nips" through which the polymers are drawn through determine the thicknesses of the films. In a separate process or using an on-line UV curing unit the crosslinkable film layer can be further irradiated to produce the desired performance.

Figure 6:
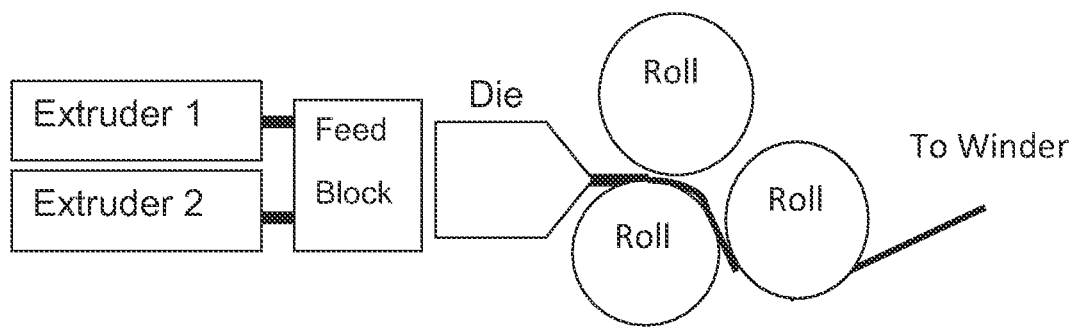
FIG. 6 is a diagram of the components of a calendaring process in which two films are co-extruded.

FIG. 6 depicts an alternate process. A co-extruded multi-layer film can be made via calendaring process with a set of extruders each supplying the molten resin for the individual layers. These melt streams are then fed into a feed block and then a die that in turn feed a set of calendaring rolls. A multi-manifold die can be used to obtain more uniform composite layers. For example, one layer (aka a cap layer) can be the film layer with the photoactive additive, and a second layer is a base layer. The cap layer can be from 2% to 40% of the total thickness of the film. The cap layer may be from 2.5 micrometers to 12.7 millimeters (0.00001 inch to about 0.5 inches) in thickness.

Generally, the film layer/cap layer is described above with reference to a film. However, it is contemplated that the film layer/cap layer can also be made as a sheet, or can be placed on a sheet or a thin walled article. In this regard, the film layer containing the photoactive additive can have a thickness of 2.5 micrometers to 1 millimeter, or a thickness of 2.5 micrometers to 3 millimeters, or a thickness of 1 millimeter to about 5 millimeters.

UV Irradiation

The film is then exposed to ultraviolet (UV) light at an appropriate wavelength and in an appropriate dosage that brings about the desired amount of crosslinking for the given application. Depending on the end use application and the desired properties, the UV exposure can be performed on one or more surfaces of the film.

The film where the enhanced properties are needed should be exposed with a substantially uniform dose of UV light. The exposure can be accomplished using standard methods known in the art. For example, the UV light can come from any source of UV light such as, but not limited to, those lamps powered by microwave, HID lamps, and mercury vapor lamps. In some other embodiments, the film is exposed by using natural sunlight. The exposure time will be dependent on the application and color of material. It can range from a few minutes to several days. Alternatively, the crosslinking can be accomplished by using a UV-emitting light source such as a mercury vapor, High-Intensity Discharge (HID), or various UV lamps. For example, commercial UV lamps are sold for UV curing from manufacturers such as Hereaus Noblelight Fusion UV. Non-limiting examples of UV-emitting light bulbs include mercury bulbs (H bulbs), or metal halide doped mercury bulbs (D bulbs, H+ bulbs, and V bulbs). Other combinations of metal halides to create a UV light source are also contemplated. Exemplary bulbs could also be produced by assembling the lamp out of UV-absorbing materials and considered as a filtered UV source. An undoped mercury arc lamp is not used for irradiation. An H bulb has strong output in the range of 200 nm to 320 nm. The D bulb has strong output in the 320 nm to 400 nm range. The V bulb has strong output in the 400 nm to 420 nm range.

It can be beneficial to control the temperature. Often increased temperature can increase the crosslinking, but if the temperature is excessive the film can become unacceptably discolored, warped, or distorted.

It may also be advantageous to use a UV light source where the harmful wavelengths (those that cause polymer degradation or excessive yellowing) are removed or not present. Equipment suppliers such as Heraeus Noblelight and Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction.

UV wavelengths can be separated into four different categories. UVA refers to wavelengths from 320 nm to 390 nm. UVB refers to wavelengths from 280 nm to 320 nm. UVC refers to wavelengths from 250 nm to 260 nm. UVV refers to wavelengths from 395 nm to 445 nm. In some embodiments, the UV radiation is filtered to provide an effective dosage of at least 2 J/cm$^2$ of UVA radiation and no detectable UVC radiation, as measured using an EIT PowerPuck. In other more specific embodiments, the UV radiation is filtered to provide an effective dosage of at least 3 J/cm$^2$ of UVA radiation and no detectable UVC radiation, or at least 12 J/cm$^2$ of UVA radiation and no detectable UVC radiation, or at least 36 J/cm$^2$ of UVA radiation and no detectable UVC radiation, as measured using an EIT PowerPuck.

In particular embodiments, the film is exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

The exposed film will have a cross-linked outer surface and an inner surface that is either lightly cross-linked or not cross-linked. The outer surface can be cross-linked to such a degree that the outer surface is substantially insoluble in the common solvents for the starting resins.

The following example is provided to illustrate the polymeric blends, articles, processes and properties of the present disclosure. The examples are merely illustrative and are not intended to limit the disclosure to the materials, conditions, or process parameters set forth therein.

EXAMPLE

A crosslinkable polycarbonate film was extruded on a small scale extrusion line. The setup included the use of polish chrome plated steel roll with Ra between 0-1 micro inch to impart a polish finish texture to the calendared film. A 1.5" extruder with a barrier screw and a 16" wide die was used. The preferred process conditions are as follows. The melt temperature in the preferred set up was measured at 552° F. and the run rate for a 10 mil thick film was approximately 30 lbs/hr.

The crosslinkable polycarbonate film was subsequently exposed to UV energy of a specific spectral distribution and intensity to activate free radicals and initiate the polymerization crosslinking. In this case, two D' type bulbs arranged lengthwise each manufactured by Fusion UV systems were used to expose the film. The film was placed on a conveyor belt that runs at a speed between 20 ft/min and 80 ft/min equipped with two modular F300S Fusion UV system lamps. The UV lamp setup consisted of two independent 6-inch lamp units that were placed end-to-end to form a 12 inch continuous system. The film to be irradiated was placed on the conveyor and positioned in the focal plane approximately 2.1" below the lamp bottom. In each modular Fusion UV system, microwave energy from a single magnetron is directed into the cavity of the aluminum reflector. The lamp bulb is located inside the chamber with the screen over the bottom of the reflector. The screen keeps the microwave inside the chamber while allowing UV light to pass to irradiate the film to be cured. The electrical input to the lamps is provided by P300M power supply units.

The crosslinkable polycarbonate (XPC) film samples not exposed to UV light and those exposed to UV light were tested for scratch resistance via pencil hardness test (ASTM D3363 method) with 500 g load. Generally, in the pencil hardness test of ASTM D3363, a load of 1 kgf is applied to a disk at room temperature using a set of pencils having known hardnesses. A scratch rating is given based on the visibility of a scratch on a set of 5 specimens. The scratch ratings are 6B (softest), 5B, 4B, 3B, 2B, B, HB, F, H, 2H, 3H, 4H, 5H, and 6H (hardest).

Pencil hardness as measured using the ASTM D3363 method showed improved hardness after exposure to UV. UV light exposure was measured using a belt radiometer International light IL390A light bug. The radiometer measures a broad UV spectrum from 250-400 nm with peak sensitivity at 365 nm. The film was exposed by running it on a conveyor set up with two F300S Fusion UV modular lamp systems side by side operating. Multiple passes of the film were made to achieve the desired exposure. For comparison and as controls, LEXAN® HP92S and LEXAN® 8010 film were used. LEXAN® HP92S is coated with a proprietary acrylate hard coat specifically designed to improve surface durability against scratch. LEXAN® 8010 is a commercial uncoated polycarbonate film that has a glossy polish surface finish. Table 1 shows the results:

TABLE 1

| Samples | Pencil Hardness @ 500 g |
| --- | --- |
| LEXAN ® HP92S film | HB-F |
| LEXAN ® 8010 film | 2B-3B |
| XPC film unexposed | B |
| XPC film exposed 1600 mJ/cm$^2$ | B |
| XPC film exposed 3200 mJ/cm$^2$ | HB |

As seen here, the exposed XPC films had good pencil hardness that was comparable to the commercial coated LEXAN® HP92S film, and had better pencil hardness than the uncoated LEXAN® 8010 film.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A thin walled product comprising:
a crosslinked layer formed from a photoactive additive that has been exposed to ultraviolet light, the photoactive additive containing photoactive endcap groups derived from monohydroxybenzophenone and endcap groups derived from a non-photoactive end-capping agent;
wherein the photoactive additive is a homopolycarbonate formed from the reaction of:
the monohydroxybenzophenone;
a diol chain extender which is bisphenol A;
a first linker moiety which is phosgene; and
the non-photoactive end-capping agent; and
wherein the photoactive additive has a monohydroxybenzophenone-derived endcap content from 3.0 to 5.0 mol %; and
wherein the photoactive additive does not contain any aliphatic polyester, aliphatic polyether, aliphatic polythioether, aliphatic polyacetal, aliphatic polycarbonate, C-C linked polymer, and polysiloxane segments.

2. The thin walled product of claim 1, wherein the thin walled product has a scratch rating of B or harder according to ASTM D3363.

3. The thin walled product of claim 2, further comprising a substrate layer formed from a substrate resin and bonded to the crosslinked layer.

4. The thin walled product of claim 1, wherein the monohydroxybenzophenone is 4-hydroxybenzophenone.

5. The thin walled product of claim 4, wherein the photoactive additive has a weight average molecular weight of 15,000 or greater, measured prior to crosslinking.

6. The thin walled product of claim 1, wherein the non-photoactive end-capping agent is selected from the group consisting of phenol, p-t-butylphenol, p-cumylphenol, octylphenol, and p-cyanophenol.

7. The thin walled product of claim 1, wherein the reaction that forms the photoactive additive further comprises a secondary linker moiety having at least three functional groups, each of which can react with a linking group of the first linker moiety.

8. A process for making the thin walled product of claim 1, comprising:

extruding a film layer comprising the photoactive additive; and
exposing the film layer to ultraviolet light to induce crosslinking in the film layer and obtain the thin walled product.

9. The process of claim 8, wherein the film layer is co-extruded with a substrate resin that forms a substrate layer bonded to the film layer.

10. The process of claim 8, wherein the thin walled layer has a scratch rating of B or harder according to ASTM D3363.

11. The process of claim 8, wherein the film layer further comprises a polymeric base resin.

12. A thin walled product comprising:
a crosslinked layer formed from a photoactive additive that has been exposed to ultraviolet light, the photoactive additive containing photoactive endcap groups derived from monohydroxybenzophenone;
and
wherein the photoactive additive has a monohydroxybenzophenone-derived endcap content from 3.0 to 5.0 mol %; and
the photoactive additive has a structure of Formula (II):

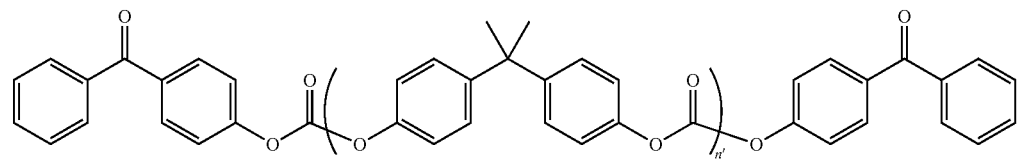

Formula (II)

wherein n' ranges from 29 to 65, and
wherein the thin walled product further comprises a substrate layer formed from a substrate resin and bonded to the crosslinked layer, and the thin walled product has a scratch rating of B or harder according to ASTM D3363.

13. The thin walled product of claim 12, wherein the crosslinked layer is from about 2% to about 40% of the thickness of the thin walled product.

14. The thin walled product of claim 12, wherein the crosslinked layer has a thickness of about 2.5 micrometers to about 12.7 millimeters.

15. The thin walled product of claim 12, wherein the substrate resin is a polycarbonate film.

16. The thin walled product of claim 12, wherein the photoactive additive has a weight-average molecular weight of between 17,000 and 80,000 Daltons, as measured by gel permeation chromatography using a UV-VIS detector and polycarbonate standards.

17. The thin walled product of claim 12, wherein the crosslinked layer further comprises a polymeric base resin which is different from the photoactive addictive.

18. The thin walled product of claim 12, wherein the crosslinked layer further comprises a flame retardant.

* * * * *